No. 872,229. PATENTED NOV. 26, 1907.
A. L. GIFFORD.
SOLDERING IRON.
APPLICATION FILED FEB. 14, 1907.
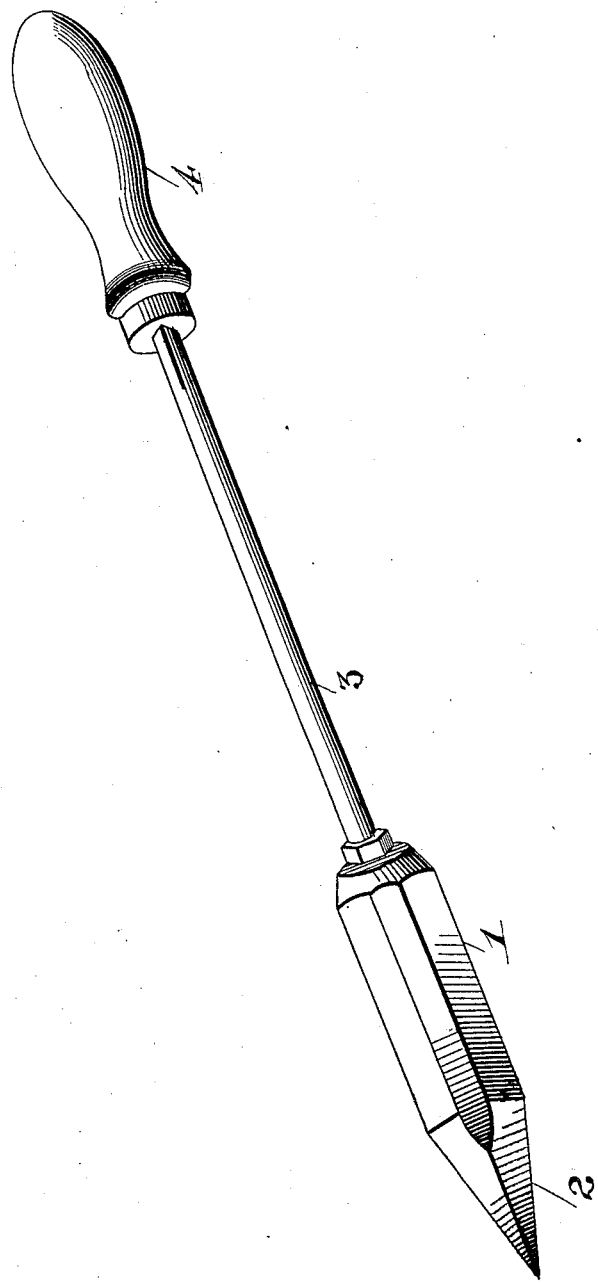

UNITED STATES PATENT OFFICE.

ARTHUR L. GIFFORD, OF OIL CITY, PENNSYLVANIA, ASSIGNOR OF ONE-HALF TO LESTER L. LEWIS, OF OIL CITY, PENNSYLVANIA.

SOLDERING-IRON.

No. 872,229. Specification of Letters Patent. Patented Nov. 26, 1907.

Application filed February 14, 1907. Serial No. 357,422.

*To all whom it may concern:*

Be it known that I, ARTHUR L. GIFFORD, a citizen of the United States, residing at Oil City, in the county of Venango and State of Pennsylvania, have invented certain new and useful Improvements in Soldering-Irons; and I do hereby declare the following to be a full, clear, and exact description of the invention, such as will enable others skilled in the art to which it appertains to make and use the same.

This invention relates to improvements in soldering irons, and the object in view is the maintenance of a soldering iron constantly in a tinned condition.

With this and further objects in view the invention comprises certain novel features of construction and combination of elements hereinafter fully described and claimed.

In the accompanying drawing, the figure is a perspective view of a hand soldering iron embodying the features of the present invention.

There has been felt throughout the entire trade in all of the industrial arts employing soldering apparatus the need for a soldering iron which will be constantly maintained in a condition wherein heating of the iron is all that is necessary for rendering the same in condition for immediate operation. In the present art the term "tinned" is employed to designate a condition of the soldering iron wherein the adhesion between the heated iron and certain portions of molten solder will exceed the cohesion of the molten solder. In other words, it is common when a soldering iron has been heated to too great an extent, or the tinned surface destroyed in any other way to apply an acid or rosin to the heated iron and then apply the iron to tin with frictional contact to cause a portion of the tin to adhere to the iron and produce a brightened surface thereon. The condition thus acquired by the iron is known in the art as "tinned" and makes possible the picking up of particles of solder directly on the heated iron. It has been common heretofore to employ pure copper irons, which in practice have required frequent tinning as a result of overheating or of collecting foreign substances during operation and from other causes, and it is the object of the present invention to overcome the annoyance and delay occasioned by the necessity for frequent tinning, regardless of the cause for the necessity for the tinning.

With this object in view I have produced as a result of many years of experimenting, a soldering iron consisting of a compound of copper and block tin, which iron is capable of obviating the difficulties above explained, the copper serving as a base and the tin compounding therewith and imparting to the resultant compound the quality of adhesion for solder.

In the accompanying drawing, I have illustrated an iron which consists of the usual body portion 1, which may be of any size or shape desired, and formed with a tapered point 2 designed for facilitating soldering operations and for the concentration of heat from the body portion of the iron. A handle 3 is preferably connected to the end of the body portion 1 opposite the point 2, and the free end of the handle 3 is provided with a suitable grip 4.

In practice the point 2 is usually employed in performing soldering operations, and it is only necessary to heat the iron sufficiently for the soldering operation and then to proceed without stopping for tinning the iron. It is to be noted that it is not necessary to limit the soldering operation to the point 2, as any portion of the body portion 1 may be used for performing soldering operations, and the molten solder will adhere to any portion of the body portion 1 without the usual or ordinary operation of tinning as quickly and readily as to the point 2.

It is to be noted that while I have illustrated a hand soldering iron, the present invention is by no means limited to a hand iron, but is capable of being employed in conjunction with any form of soldering iron whatever whether machine operated or manually operated.

The best method of producing my improved soldering iron is by depositing into a quantity of molten copper a required quantity of block tin, and if preferred the mixture may be stirred, although stirring is not absolutely necessary for producing the desired results. Of course, a hardening chemical or other substance may be introduced into the molten metal if preferred. I find by experimenting that the degrees of hardness of the resultant product may also be varied by varying the proportions of copper and tin, an increased proportion of copper increasing the hardness and a decreased proportion of copper decreasing the hardness.

I find that I can produce a successful soldering iron embodying the present invention by employing proportions of about one part tin to sixteen parts copper or even a less proportion of tin may be successfully used when a high grade of solder is employed, but perhaps a little better result is obtained by the use of two parts tin to sixteen parts copper. I find that as much as five parts tin may be used to sixteen parts of copper and produce a successful and highly efficient soldering iron, but when this amount of tin is employed the iron produced is designed preferably for being heated by gas, and when heated by charcoal care must be exercised not to raise the temperature of the iron to the melting point, the melting point being at a considerably lower temperature than with irons containing a larger proportion of copper.

I wish it distinctly understood however, that I do not consider myself limited to any specific relationship of proportions of one metal with respect to another as it will be of course obvious that the proportions of tin and copper may be varied and chemicals or other materials may be introduced for giving the required hardness, even though larger proportions of tin are employed than above indicated.

In experimenting with my present improved soldering iron, I have found that regardless of the amount of heat applied to the iron, so long as the iron is not melted, it never loses its property of adhesion for solder, and while the regular copper iron, when excessively heated loses its coating of solder and its property of adhesion for solder, whereupon such ordinary copper iron must be retinned, the present improved iron may be excessively heated and the only thing necessary for placing the iron in condition for immediate use is to permit it to cool down to a soldering temperature, the ordinary process of tinning being unnecessary.

What I claim is,—

1. A soldering iron comprising a body portion formed of a compound of tin and copper in such proportions as to impart to the iron, when heated, the inherent quality of adhesion for solder.

2. A soldering iron comprising a compound of a relatively large proportion of copper and a relatively small proportion of tin, the proportions being such as to give the iron when heated the inherent quality of adhesion for solder.

3. A soldering iron comprising a body portion formed of a compound of a base material with tin in such proportions as to impart to the iron when heated the inherent quality of adhesion for solder.

4. A soldering iron comprising a body portion formed of a compound of copper and a solder adhering element compounded in such proportions as to impart to the iron when heated the inherent quality of adhesion for solder.

5. A soldering iron comprising a body portion formed of a base material and a solder adhering element compounded in such proportions as to permanently impart to the iron, when heated, the inherent quality of adhesion for solder regardless of any degree of heat applied to the iron below the melting point.

In testimony whereof I affix my signature in presence of two witnesses.

ARTHUR L. GIFFORD.

Witnesses:
GEO. W. MORGAN,
LESTER L. LEURS.